(12) United States Patent
Diebel

(10) Patent No.: US 9,210,485 B2
(45) Date of Patent: Dec. 8, 2015

(54) DEVICE AND METHOD FOR THE RECOGNITION OF CALL NUMBERS FOR VOICE-OVER-IP TELEPHONY

(75) Inventor: Heinrich Diebel, Strasslach-Dingharting (DE)

(73) Assignee: Unify GmbH & Co. KG, Munich (DE)

( * ) Notice: Subject to any disclaimer, the term of this patent is extended or adjusted under 35 U.S.C. 154(b) by 2386 days.

(21) Appl. No.: 11/992,527

(22) PCT Filed: Sep. 4, 2006

(86) PCT No.: PCT/EP2006/065946
§ 371 (c)(1),
(2), (4) Date: Mar. 25, 2008

(87) PCT Pub. No.: WO2007/036410
PCT Pub. Date: Apr. 5, 2007

(65) Prior Publication Data
US 2009/0274142 A1 Nov. 5, 2009

(30) Foreign Application Priority Data
Sep. 26, 2005 (DE) .......................... 10 2005 045 890

(51) Int. Cl.
*H04L 12/66* (2006.01)
*H04Q 3/76* (2006.01)
(Continued)

(52) U.S. Cl.
CPC ................. *H04Q 3/76* (2013.01); *H04M 7/128* (2013.01); *H04Q 3/0045* (2013.01); *H04M 7/006* (2013.01); *H04Q 2213/13034* (2013.01); *H04Q 2213/13389* (2013.01)

(58) Field of Classification Search
CPC ........ H04M 7/128; H04M 7/006; H04Q 3/76; H04Q 3/0045; H04Q 2213/13389; H04Q 2213/13034

USPC .......................................... 370/352–356, 401
See application file for complete search history.

(56) References Cited

U.S. PATENT DOCUMENTS 5,568,546 A * 10/1996 Marutiak ................. 379/355.05
6,389,005 B1   5/2002 Cruickshank
(Continued)

FOREIGN PATENT DOCUMENTS

CN          1492662 A      4/2004
DE       102 28 919 B4     2/2005
(Continued)

OTHER PUBLICATIONS

Faltstrom, P. and Mealling, M.; "The E.164 to Uniform Resource Identifiers (URI) Dynamic Delegation Discovery System (DDDS), Application (ENUM)"; Network Working Group; Request for Comments: 3761; Apr. 2004; pp. 1-15.
(Continued)

*Primary Examiner* — Luat Phung
(74) *Attorney, Agent, or Firm* — Buchanan Ingersoll & Rooney PC

(57) ABSTRACT

Call numbers are recognized in order to establish a connection from a lie-switched network to a packet-switched network. In one aspect, a device comprises a unit for detecting a selected string of digits as a selected call number, a unit for storing a plurality of authorized call numbers, a comparator unit for comparing the selected all number to the plurality of stored call numbers, and a unit for converting the selected call number into an associated IP address as soon as the comparator unit detest that the selected call number matches one of the stored all numbers.

14 Claims, 3 Drawing Sheets

(51) Int. Cl.
*H04M 7/12* (2006.01)
*H04Q 3/00* (2006.01)
*H04M 7/00* (2006.01)

(56) References Cited

U.S. PATENT DOCUMENTS

| | | | |
|---|---|---|---|
| 6,760,431 | B1 | 7/2004 | Haimi-Cohen |
| 2002/0186686 | A1 | 12/2002 | Chen |
| 2004/0052355 | A1* | 3/2004 | Awada et al. ............ 379/355.01 |
| 2004/0141595 | A1 | 7/2004 | Crockett et al. |
| 2005/0008008 | A1 | 1/2005 | Ohura |
| 2006/0002536 | A1* | 1/2006 | Ambrose ................. 379/201.01 |
| 2007/0010264 | A1* | 1/2007 | Sun et al. ..................... 455/466 |

FOREIGN PATENT DOCUMENTS

| | | |
|---|---|---|
| DE | 102007015538 A1 | 6/2008 |
| EP | 0 957 647 A2 | 11/1999 |

OTHER PUBLICATIONS

Cisco Systems Inc.; "Dial Peer Configuration for Cisco Voice Gateway Routers"; online; 2003; San Jose, USA; XP002407633, found in the internet: URL: www.cisco.com/univercd/cc/td/doc/product/software/ios123/123cgcr/vvfax_c/inct_c/dpeer_c/dialpeer.pdf found on Mar. 11, 2006, pp. i-xii; 9 thru 11, 1-56, A-1 thru A-10, In-1-In-2.

\* cited by examiner

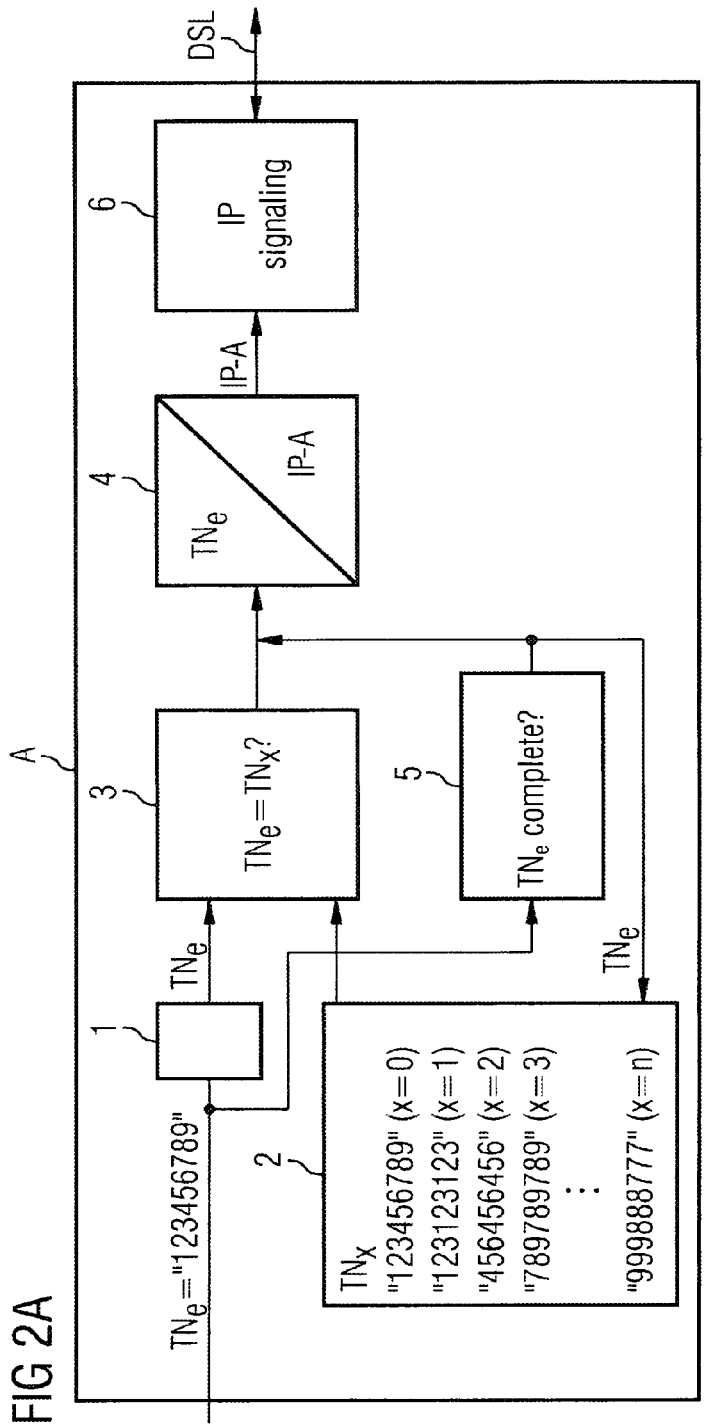
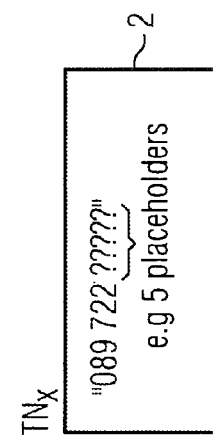

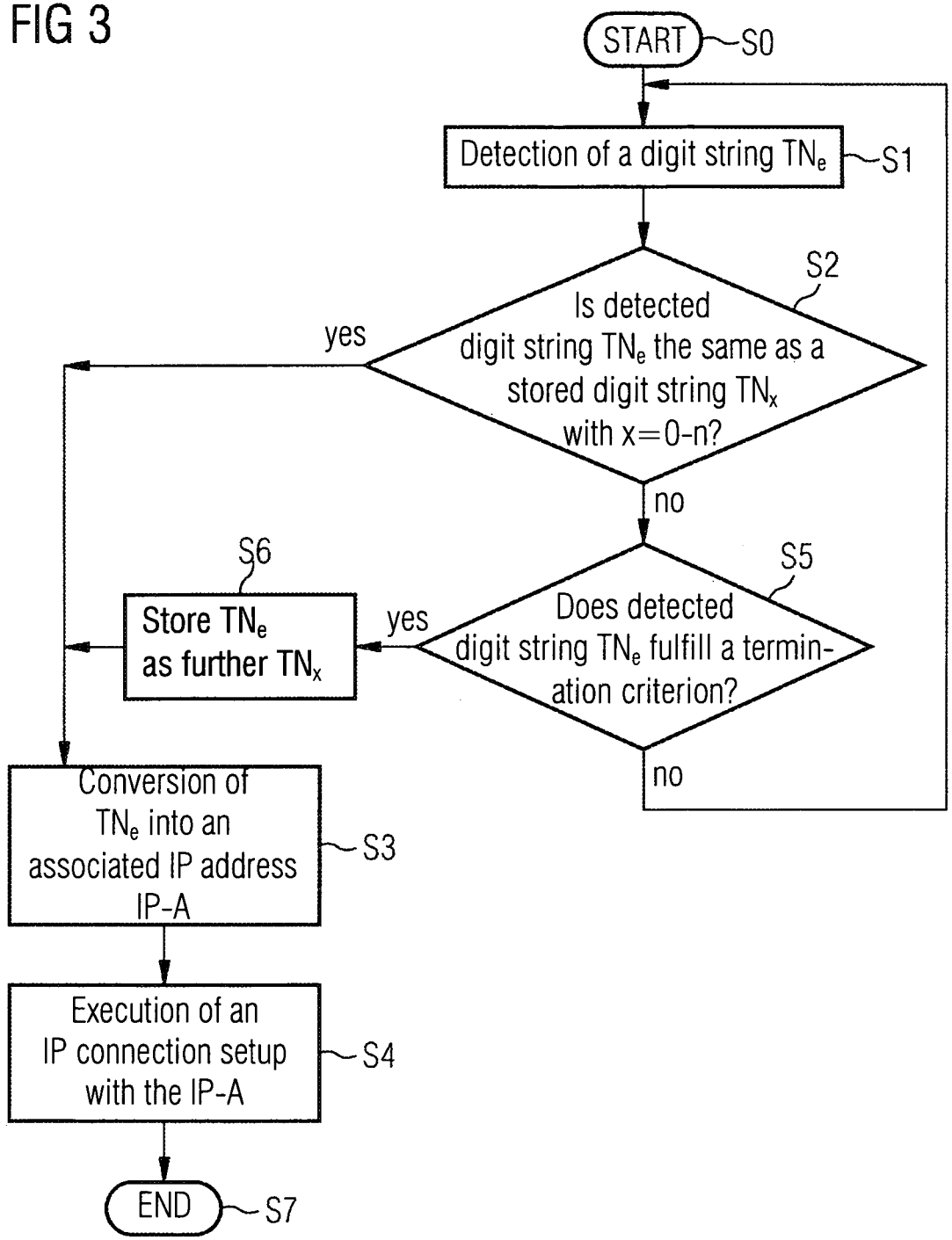

DEVICE AND METHOD FOR THE RECOGNITION OF CALL NUMBERS FOR VOICE-OVER-IP TELEPHONY

CROSS REFERENCE TO RELATED APPLICATIONS

This application is the US National Stage of International Application No. PCT/EP2006/065946, filed Sep. 4, 2006 and claims the benefit thereof. The International Application claims the benefits of German application No. 10 2005 045 890.4 DE filed Sep. 26, 2005, both of the applications are incorporated by reference herein in their entirety.

FIELD OF INVENTION

The underlying invention relates to a device and a method for the recognition of call numbers for voice-over-IP telephony and in particular to a device and a method for the implementing an accelerated connection establishment from a circuit-switched network to a packet-switched network.

BACKGROUND OF INVENTION

In the case of the so-called "voice-over-IP telephony", private branch exchanges or other technical devices such as for example private exchanges or public exchanges are coupled by means of special gateways via the Internet or an intranet in such a way that it is possible to make a call from a conventional (circuit-switched) telephone or a telecommunication terminal to another conventional telephone or an IP telephone (packet-switched terminal device) by using the "normal" telephone numbers or the call numbers.

FIG. 1 shows a simplified block diagram of a telecommunication system for the implementation of such a "voice-over-IP telephony", in accordance with the prior art, it for example being possible that conventional telecommunication terminal devices TE1 and TE2 are integrated into a circuit-switched network, such as for example a conventional network with a public exchange (PSTN, Public Switched Telephone Network) or a private exchange.

To implement signaling adaptation, provision is made for a signaling adapter A in accordance with FIG. 1, which for example converts the call number TNe generated by pulse dialing or tone dialing (DTMF, Dual Tone Multiple Frequency) into an IP address IP-A. With such an IP address a connection setup or a signaling can be carried out in a packet-switched network N, such as for example the Internet or an intranet up to an IP terminal device IP-TE, which for example has a personal computer PC and has an input/output unit EA connected thereto. A connection between the two telecommunication terminal devices IP-TE and the signaling adapter A to the packet-switched network N is made for example by means of a DSL line (Digital Subscriber Line).

In the case of such adapters which make further connections over Internet protocols (for example, SIP, Session Initiated Protocol), as are implemented for example in the switching systems or private branch exchanges, a telephone number selected by a connected telecommunication terminal device TE1 or TE2 or a call number TNe must be completely known before the start of the Internet-side protocol setup, since the interpretation is not performed digit-by-digit by the exchange itself or by superordinate exchanges, as is the case in the conventional circuit-switched network. That means that the exchange itself does not have a criterion by which it recognizes a last digit of a selected digit sequence for a call number TNe of a connected telecommunication terminal device TE1 or TE2. This applies both to pulse dialing, by means of which the digits are produced by a plurality of pulses, and to a tone dialing (DTMF, Dual Tone Multiple Frequency), by means of which a predetermined frequency is produced and transferred for each digit.

SUMMARY OF INVENTION

Thus, in accordance with the prior art, the end of a telephone number or a call number is only accepted in the signaling adapter A or in an appropriate exchange if the telecommunication terminal device TE1 or TE2 no longer sends a further digit for a pre-determined period of time,. In this case, time intervals of at least five seconds are usually used, in order not to prematurely detect the end of the number even with manually selected call numbers. To put it more precisely, this means that the exchange itself or a specific signaling adapter A has no criterion, by means of which the last digit of a selected call number TNe can be detected by a connected telecommunication terminal device.

As an alternative to the prior art, the option also exists of supplementing the call number selected at the telecommunication terminal device TE1 or TE2 by pressing a specific key or a special character such as for example "#", after the last selected digit to clearly inform the signaling adapter A or the exchange about the end of a call number and to avoid the above-described waiting period.

The object underlying the present invention is thus to provide a device and a method for the recognition of call numbers for voice-over-IP telephony, in which both a waiting period for the connection setup is reduced and ease of use is improved for the user.

This object is achieved in accordance with the invention by a device and a method in accordance with the independent claims.

In particular by making use of a subscriber number storage unit for storing a plurality of authorized call numbers and a comparator unit for comparing the call number dialed with the plurality of stored call numbers, with a conversion unit converting the selected subscriber call number into an associated IP address as soon as the comparator unit detects that the selected subscriber call number matches one of the stored call numbers, both the waiting period for establishing a connection from a circuit-switched network to a packet-switched network can be substantially reduced and unchanged user behavior at conventional telecommunication terminal devices can be maintained.

With regard to the method, a selected call number is consequently compared with a plurality of authorized stored call numbers and the selected call number is converted into an associated IP address as soon as the selected call number matches one of the stored call numbers.

Preferably an end of the selected string of digits is recognized by a unit for recognizing the end of a string of digits, with, in the event of the end being detected, the selected call number being able to be stored additionally in the call number storage unit. Although this can result in waiting periods in the case of unknown call numbers, a system capable or learning is obtained which, over the course of time, converts the main telephone numbers used by the user without delay into IP addresses and in this way makes an accelerated connection setup possible.

In this case, the stored call numbers can be sorted according to their frequency of use and/or according to their length of time in storage whereby, in the case of storage overflow, the call number with the lowest frequency and/or the greatest length of time in storage can be deleted. The ability of the device to learn as well as the associated method and the ease of use for the user is further improve improved in this way.

In particular, the stored call numbers can have at least one placeholder or so-called "wildcards" with, during the comparison by the comparator unit, only the number of digits being considered but not their explicit value. In the case of exchange structures that are already known and in particular in the case of private branch exchanges that are already known, with knowledge of the prefix digits for the private branch exchange and the fixed number of digits for telephone numbers within the private branch exchange, an immediate connection setup can be performed even for call numbers not known individually. This substantially reduces storage requirements.

Further advantageous embodiments of the invention are identified in the further subclaims.

BRIEF DESCRIPTION OF THE DRAWINGS

The invention is described in more detail below with reference to the exemplary embodiments specified in the figures.

They are as follows:

FIG. 2A a simplified block diagram of a device for the recognition of call numbers for voice-over-IP telephony in accordance with the underlying invention;

FIG. 2B a simplified block diagram of a call number storage unit in accordance with FIG. 2A, with the stored call number featuring placeholders; and FIG. 3 a simplified flowchart to illustrate a method for the recognition of call numbers for voice-over-IP telephony in accordance with the underlying invention.

DETAILED DESCRIPTION OF INVENTION

Figure 1:
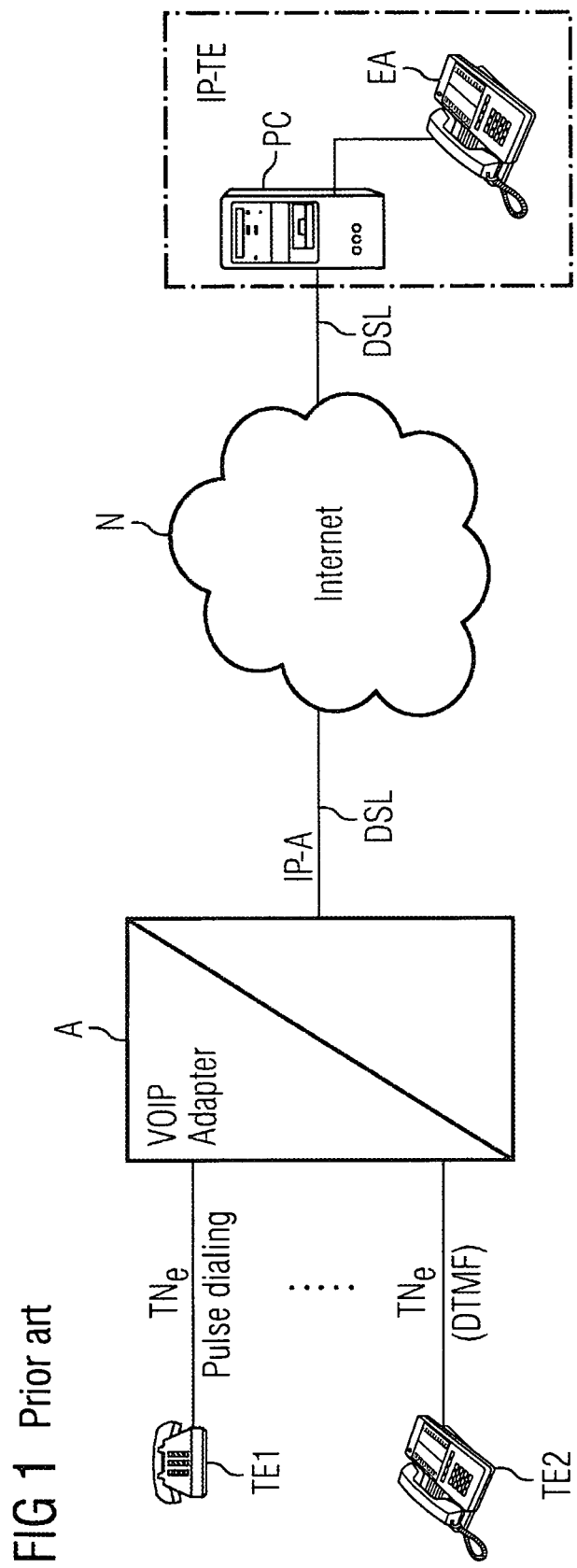
FIG. 1 a simplified block diagram of a telecommunication system for the implementation of a voice-over-IP telephony in accordance with the prior art.

FIG. 2A shows a simplified block diagram of a device for the recognition of call numbers for voice-over-IP telephony and in particular of an inventive voice-over-IP adapter A for recognition of selected digits of a call number TNe for establishing a connection from a circuit-switched network to a packet-switched network, as shown in FIG. 1.

Although the inventive signaling adapter A is preferably implemented in an exchange such as for example a public exchange or a private exchange and in particular in private branch exchanges, it can also be implemented at other locations within a heterogeneous telecommunication system with circuit-switched and packet-switched networks.

Circuit-switched networks are to be understood as networks by means of which an end-to-end channel (point-to-point connection) is switched for the entire duration of the call on which the data that can be conveyed from the transmitter to the receiver arrives. That is, all data takes the same path and always arrives in the same order in which it was placed on the path. by contrast with this, in packet-switched networks (Packed Switched Networks), such as for example the Internet or the intranet, in the case of a connection there is no physical end-to-end channel provided, but the message is divided by the transmitter itself into small individual and perhaps different-length packages, which are then sent with supplementary data to identify sender and recipient and sequence numbering independently through the network. Each packet is analyzed here in the network nodes and for each packet the network node decides as a function of the current network load about the outgoing connection via which the packet will be forwarded to the recipient. Therefore, depending on network utilization, packages might perhaps take different paths to the recipient.

In the same way establishing a connection in circuit-switched networks is distinguished from establishing a connection in packet-switched networks. Whereas with circuit-switched networks so to speak, for each selected digit of a call number, a connection setup can be accomplished at the same time as it were by the exchanges, however, with packet-switched networks, the destination address or the IP address of the destination must be completely known in order to make a connection establishment possible and to start sending the relevant packets.

Therefore, in accordance with FIG. 2A, the voice-over-IP signaling adapter A has a detection unit 1 for a string of digits, by means of which a string of digits selected by a conventional telecommunication terminal device, such as for example a pulse dialing telephone or a DTMF dialing telecommunication terminal device can be detected and evaluated as the selected call number Tne. Furthermore, a call number storage unit 2 is provided in which a plurality of authorized call numbers TNx can already be stored beforehand. In this case, x is a sequence parameter for a natural number from 0 to n.

Furthermore, in accordance with FIG. 2A, a comparator unit 3 is provided for comparing the call number TNe selected and already detected (totally or partly) by the digit string detection unit 1 with a plurality of stored call numbers TNx. To put it more precisely, in accordance with FIG. 2A a string of digits is output by a telecommunication terminal device not shown in the diagram for example by means of pulse dialing or tone dialing to the digit string detection unit 1, which in each case outputs one completely detected or only partly detected call number TNe to the comparator unit 3.

This output call number TNe can thus also be an as yet incomplete call number, since for example a dialing process is not yet completely finished. These (mostly part-completed) call numbers TNe are now compared continuously to see if they match the plurality of authorized call numbers TNx held in the storage unit 2, in which case, only if a match exists between the selected call number TNe selected and output by the detection unit 1 and a stored call number TNx is the detected call number TNe supplied to a conversion unit 4 for instantaneous conversion into an associated IP address IP-A. This IP address IP-A is forwarded afterwards by an IP signaling unit (6), which on the basis of this IP address undertakes signaling or establishes a connection in the packet-switched network, which is connected for example by means of a DSL line DSL.

Although the subscriber data for the conversion unit 4 can basically also be held locally in the signaling adapter A, it is usually obtained from a server located in a packet-switched network.

In this way there are no waiting times with call numbers TNx already known and stored beforehand when a connection is established from a circuit-switched network to a packet-switched network. Above and beyond this, no adjustments have to be made in terms of the ease of use for the user, since the conventional telecommunication terminals in the circuit-switched network can be handled as usual. In particular, the input of special characters in order to define a telephone number or end of a call number is not necessary.

To implement a learning procedure or a self-optimizing system, the signaling adapter A in accordance with FIG. 2A, can also have a digit sequence end recognition unit 5 for recognizing an end of the sequence of digits selected by the telecommunication terminal, with, at the recognized end, the selected call number TNe now being held or stored in the call number storage unit 2 as an additional authorized call number TNx. The digit string end recognition unit 5, as with the prior art can either detect the end of the string of digits on the basis of a predetermined special character or a special key, such as for example "#", or on the basis of a predetermined length of time being exceeded in which no further number is detected after a selected number. This waiting time or predetermined length of time can be set for example to a period or more than five seconds in order not to prematurely detect the end of selection even with manually selected call numbers.

Although in this way, waiting periods will still have to be taken into account for call numbers stored for the first time and not yet in the call number storage unit 2, or operating convenience is adversely affected as a result of the use of special keys or special characters, this method produces a system capable of learning since even with the second selection of the same call number the comparator unit 3 now detects the stored call number TNx and immediately triggers the delay-free conversion of the selected call number into an associated IP address IP-A, and in this way delay-free IP signaling or connection setup can be performed in a packet-switched network.

To avoid storage overflow with such an adaptive system in which a completely recognized new call number TNe is stored in each case as the authorized call number TNx in the call number storage unit 2 sorting can also be undertaken according to different criteria. Preferably, the authorized call numbers TNx stored in the call number storage unit 2 are stored according to their selected dialing frequency and, in the event of a storage overflow or if there is not sufficient storage for a new call number TNx to be written in, the call number with the smallest frequency will be deleted. In this way, the learning procedure can be optimized for normal usage, in particular in the case of a private branch exchange.

Above and beyond this, the authorized call numbers TNx stored in the call number storage unit 2 can be sorted according to the time at which they were stored or their storage history and in the event of a storage overflow or insufficient storage being available, the oldest, i.e. the call numbers TNx entered at an earliest time are to be deleted. this likewise achieves a substantial improvement in the user friendliness.

However, in accordance with FIG. 2B, there can also be authorized placeholder call numbers TNx as well as the plurality of actually existing call numbers present in the call number storage unit, which have at least one placeholder "?" as the relevant digit. Therefore, in accordance with FIG. 2B, such a call number placeholder as a result has a prefix actually existing for a private branch exchange, for example, "089722" followed by five placeholders "?????", which evaluate arbitrary number combinations on a comparison in the comparator unit 3 as authorized. As a result, not the actual digit value or content is compared for placeholder "?", but only a number of digits accordingly selected as the placeholders with the number of placeholders in the placeholder of call numbers are examined for agreement. In this way, for previously known telecommunication systems and in particular for previously known private exchanges it is possible to cover a plurality of actually existing numbers with just one placeholder call number. This greatly reduces storage requirements, whereby a further waiting time is shortened and ease of use at the conventional telecommunication terminal device remains unchanged.

FIG. 3 shows a simplified representation of a flowchart for illustrating a method for recognition of selected digits of a call number for establishing a connection from a circuit-switched network to a packet-switched network in the same way as it can be carried out by the above-described device.

After a start in step S0, in a step S1 a string of digits TNe of a selected telephone number or a call number is then first of all detected. This string can involve a pulse string of digits or a tone dialing string of digits in a conventional circuit-switched network.

In a step S2, in accordance with FIG. 3, a comparison between the selected and already detected call number TNe with a plurality of authorized and already stored call numbers TNx is undertaken, with the count value x being incremented repeatedly from 0 to n and on reaching the maximum number of call numbers TNx already stored the count value is returned to 0. In this way, the string of digits or selected call numbers already detected at a predetermined point in time can be compared to all the existing and stored call numbers TNx in each case.

As soon as the detected and selected call numbers TNe are in agreement with a stored call number TNx a branch is made to a step S3, in which a conversion of the selected and detected call numbers TNe into an associated IP address takes place. This conversion for example happens on the basis of conventional routing tables, in the same way as in the prior art, for which reason a detailed description thereof is not given below.

Subsequently, in a step S4, on the basis of this IP address signaling or a connection establishment can be undertaken in the packet-switched network. The method subsequently ends in a step S7.

However, for as long as no agreement can be established in a step S2 between the detected call numbers TNe and one of the stored call numbers TNx, the step S5 can also be carried out, in the case of which an end detection of the selected string of digits is possible. If, as a result, in a step S5, the detected string of digits or the call numbers TNe fulfill a predetermined termination or end criterion, a branch is made to a step S6, in which the detected call number TNe is stored as the further authorized call number TNx in the call number storage unit 2. As a termination criterion in step S5, the already described waiting periods can once again be evaluated for a number last received or predetermined special characters or special keys.

Subsequently, a branch is once again made to step S3 and step S4 in the case of which, by using this additionally detected call number TNe, an associated IP address IP-A is determined and an appropriate IP connection is established in the packet-switched network.

As long as neither the comparison in step S2 has established a positive match, nor has a termination criterion of the detected string of digits been fulfilled in step S5 a branch is made back to step S1 and the incoming string of digits from the conventional telecommunication terminal devices continues to be detected.

To optimize learning facilities, the stored call numbers TNx can be sorted according to their call frequency and in the case of an impending storage overflow, the call number with the lowest frequency can be deleted. In the same way, the stored call numbers TNx can be sorted additionally or alternatively according to their length of time in storage and in the case of an impending storage overflow, the oldest subscriber call number can be deleted from the storage unit 2. Furthermore, the stored authorized call numbers can also have so-called placeholders of call numbers, which have at least one placeholder as a digit which in the comparison in step S2 is only used for a number of the selected digits and remains unconsidered in respect of its digit value or digit contents.

In this way, a waiting period of the user for a connection establishment from a circuit-switched network to a packet switched network can be substantially shortened, with this simplification being produced automatically in particular for the most frequently selected call numbers without additional user actions. The known ease of use at the telecommunication terminal for the user is maintained when switching from circuit-switched telephony to packet-switched telephony, and for this reason no problems of acceptance arise. Furthermore, call numbers in so-called directories, already stored, do not have to be supplemented by further special characters in order to make a faster connection establishment possible in a specific telecommunication terminal. In the same way, in the case of synchronization with a telephone number in the terminal with telecommunication terminal devices from other networks such as for example mobile radio networks the special characters which might cause problems there does not have to be removed. Furthermore, no additional storage location is used is used up in the conventional telecommunications terminal in each directory entry for a call number-terminating special character.

The present invention has been described above on the basis of IP telephony from a circuit-switched network to a packet-switched network. It is however not limited to this and in the same way also includes further voice or data connections for example from a circuit-switched network to a packet-switched network and back into a circuit-switched network.

LIST OF REFERENCE SYMBOLS

1 Digit string detection unit
2 Cal number storage unit
3 Comparator unit
4 Conversion unit
5 End of digit string detection unit
6 IP signaling unit
TE1, TE2 Circuit-switched telecommunication terminal device
A Signaling adapter
N Packet-switched network
IP-TE Packet-switched telecommunication terminal device
PC Personal computer
EA Input/output unit
TNe Dialed call numbers
TNx Stored call numbers
DSL DSL line
? Placeholder
S0-S7 Process steps

The invention claimed is:

1. A device for recognizing selected digits of a call number comprising:
an exchange device having a call number storage unit, a detection unit, a comparator unit, and a conversion unit; and
the call number storage unit storing a plurality of call numbers in at least one non-transitory computer readable medium, each of the stored call numbers having a complete number of digits, at least one call number of the plurality of stored call numbers having at least one placeholder as a digit in the at least one call number; and
the detection unit detecting a string of digits, the string of digits having a number of digits that is less than the complete number of digits of each of the plurality of stored call numbers, the string of digits comprising prefix digits for a private branch exchange; and
the comparator unit continuously comparing the detected string of digits to the plurality of stored call numbers to identify a desired call number that corresponds to the detected string of digits; and
the conversion unit converting the desired call number identified by the comparator unit into an IP address as soon as the desired call number is identified; and
wherein the call number storage unit deletes a stored call number of the plurality of stored call numbers based on a predetermined criteria, the predetermined criteria for deleting the stored call number being the stored call number having a lowest frequency of use or the stored call number being stored for a longest period of time.

2. The device of claim 1, wherein the conversion unit converts the desired call number to the IP address based on a routing table received from a server.

3. A device for recognizing selected digits of a call number comprising:
an exchange device having a call number storage unit, a detection unit, a comparator unit, and a conversion unit; and
the call number storage unit storing a plurality of call numbers in at least one non-transitory computer readable medium, each of the stored call numbers having a complete number of digits, at least one call number of the plurality of stored call numbers having at least one placeholder as a digit in the at least one call number; and
the detection unit detecting a string of digits, the string of digits having a number of digits that is less than the complete number of digits of each of the plurality of stored call numbers, the string of digits comprising prefix digits for a private branch exchange; and
the comparator unit continuously comparing the detected string of digits to the plurality of stored call numbers to identify a desired call number that corresponds to the detected string of digits; and
the conversion unit converting the desired call number identified by the comparator unit into an IP address as soon as the desired call number is identified; and
wherein the call number storage unit sorts the plurality of stored call numbers according to their frequency of use or length of time in storage.

4. The device of claim 3, wherein the exchange device further comprises a digit string end detection unit that detects an end of the string of digits based on a predetermined special character or a predetermined period of time that is exceeded after a selected digit is detected by the detection unit.

5. The device of claim 3, further comprising an IP signaling unit that performs signaling in a packet switched network based on the IP address.

6. The device of claim 3, wherein the detection unit detecting at least one additional digit entered into the string of digits to form an updated string of digits and the comparator unit comparing the updated string of digits to the plurality of stored call numbers to identify the desired call number that corresponds to the updated string of digits.

7. The device of claim 3, wherein the exchange device comprises a public exchange or a private exchange.

8. A method for recognizing selected digits of a call number comprising:
an exchange device storing a plurality of call numbers, each of the stored call numbers having a complete number of digits, at least one call number of the plurality of stored call numbers having at least one placeholder as a digit in the at least one call number;
the exchange device receiving a string of digits, the string of digits comprising prefix digits for a private branch exchange, the string of digits having a number of digits that is less than the complete number of digits of each of the plurality of stored call numbers;

the exchange device continuously comparing the received string of digits to the plurality of stored call numbers to identify a desired call number of the plurality of stored call numbers that corresponds to the received string of digits; and the exchange device converting the desired call number into an IP address as soon as the desired call number is identified;

the exchange device deleting a stored call number of the plurality of stored call numbers based on a predetermined criteria, wherein the predetermined criteria for deleting the stored call number being the stored call number having a lowest frequency of use or the stored call number being stored for a longest period of time.

9. A method for recognizing selected digits of a call number comprising:

an exchange device storing a plurality of call numbers, each of the stored call numbers having a complete number of digits, at least one call number of the plurality of stored call numbers having at least one placeholder as a digit in the at least one call number;

the exchange device receiving a string of digits, the string of digits comprising prefix digits for a private branch exchange, the string of digits having a number of digits that is less than the complete number of digits of each of the plurality of stored call numbers;

the exchange device continuously comparing the received string of digits to the plurality of stored call numbers to identify a desired call number of the plurality of stored call numbers that corresponds to the received string of digits; and the exchange device converting the desired call number into an IP address as soon as the desired call number is identified;

the exchange device sorting the plurality of stored call numbers based on frequency of use or length of time in storage.

10. The method of claim 9, further comprising carrying out signaling in a packet-switched network based on the IP address.

11. The method of claim 9, further comprising the exchange device detecting an end of the string of digits based on receipt of a predetermined special character or a predetermined period of time that is exceeded after a selected digit is received.

12. The method of claim 9, wherein the exchange device receiving the string of digits comprises the exchange device receiving the string of digits from a circuit switched network.

13. The method of claim 9, further comprising the exchange device detecting at least one additional digit entered into the string of digits to form an updated string of digits and the exchange device comparing the updated string of digits to the plurality of stored call numbers to identify the desired call number of the plurality of stored call numbers that corresponds to the updated string of digits.

14. The method of claim 9, wherein the exchange device converting the identified call number into the IP address comprises the exchange device converting the identified call number into the IP address based on a routing table received from a server.

\* \* \* \* \*